(12) United States Patent
Lien

(10) Patent No.: US 8,403,133 B2
(45) Date of Patent: *Mar. 26, 2013

(54) ONE-HAND OPERABLE DATA DISC CASE

(76) Inventor: Chin-Hsiung Lien, El Monte, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/199,697

(22) Filed: Sep. 6, 2011

(65) Prior Publication Data

US 2012/0000802 A1    Jan. 5, 2012

Related U.S. Application Data

(63) Continuation-in-part of application No. 12/584,799, filed on Sep. 11, 2009, now Pat. No. 8,038,002.

(51) Int. Cl.
*B65D 85/57* (2006.01)

(52) U.S. Cl. .................... 206/308.1; 206/493

(58) Field of Classification Search ............. 206/308.1, 206/493, 308.2, 307, 311, 312, 232, 303
See application file for complete search history.

(56) References Cited

U.S. PATENT DOCUMENTS

| | | | | |
|---|---|---|---|---|
| 3,908,824 A | * | 9/1975 | Takahara et al. | 206/312 |
| 4,627,534 A | * | 12/1986 | Komiyama et al. | 206/387.1 |
| 4,635,792 A | * | 1/1987 | Yamada et al. | 206/308.1 |
| 4,639,813 A | * | 1/1987 | Uno | 360/128 |
| 4,881,640 A | * | 11/1989 | Herr et al. | 206/313 |
| 5,263,580 A | * | 11/1993 | Ciba et al. | 206/308.1 |
| 5,407,073 A | * | 4/1995 | Uchida | 206/308.3 |
| 5,429,240 A | * | 7/1995 | Biebel et al. | 206/455 |
| 5,697,499 A | * | 12/1997 | Reiter | 206/308.1 |
| 5,715,938 A | * | 2/1998 | Cheris et al. | 206/308.1 |
| 6,409,014 B1 | * | 6/2002 | Hummell et al. | 206/308.1 |
| D520,799 S | * | 5/2006 | Breuner | D6/634 |
| 7,658,282 B2 | * | 2/2010 | Costel | 206/308.1 |
| 2006/0042968 A1 | * | 3/2006 | Goldberg | 206/232 |
| 2007/0000798 A1 | * | 1/2007 | Gelardi | 206/308.1 |

* cited by examiner

*Primary Examiner* — Steven A. Reynolds
(74) *Attorney, Agent, or Firm* — Raymond Y. Chan; David and Raymond Patent Firm

(57) ABSTRACT

A data disc case includes a base panel and an one-hand operable arrangement which includes an affixing panel affixing on the base panel and a foldable panel extended from the affixing panel to foldably overlap on the base panel, wherein the affixing panel and foldable panel are extended edge to edge to form a cover panel on the base panel and to define a compartment between the cover panel and the base panel for accommodating a data disc therewithin. The foldable panel at the cover panel is movably overlapping with the base panel to foldably flip the foldable panel of the cover panel between an open position in a one-hand operable manner for exposing the data disc within the compartment to be accessed and an enclosed position for enclosing the data disc within the data disc case.

5 Claims, 5 Drawing Sheets

ONE-HAND OPERABLE DATA DISC CASE

CROSS REFERENCE TO RELATED APPLICATION

This is a Continuation-In-Part Application that claims the benefit of priority under 35U.S.C. §119 of earlier filed U.S. non-Provisional patent application having an application Ser. No. 12/584,799 and a filing date of Sep. 11, 2009, which is U.S. Pat. No. 8,038,002 issued on Oct. 18, 2011.

BACKGROUND OF THE PRESENT INVENTION

1. Field of Invention

The present invention relates to a data disc case, and more particularly to a one-hand operable data disc case, which has a chamber for containing the data disc without directly contact the data disc with an interior surface of the chamber, so as to allow a user to operatively open the case in one hand manner.

2. Description of Related Arts

The data discs, such as compact discs, are commonly used for storing information and being carried around from place to place. The data disc has two sides and a center hole for being held by a user and coaxially coupling with a machine for being read in a laser manner. One side of the compact disc has printing information relating to the data stored in the compact disc printed thereon as a label, and the other side has storing information adapted for being read out of various intensities of reflected light of laser beam, so as to be played or read via an electronic device, such as computer or CD player.

In order to protect the data disc from scratching or accumulating any dust or dirt on the information side of the data disc, a disc case is widely provided for storing the data disc while the disc is not in use. Conventionally the data disc case is made by a solid plastic material having a bottom holder for retaining the disc therein and a cover hinged with the bottom holder for overlapping with the bottom holder to cover and enclose the disc between the bottom holder and cover.

However, it is difficult to open the cover and bottom holder of the disc case by one hand operation. The cover and bottom holder are tidily interlocking with each other for securely enclosing the disc therewithin. The user has to apply a certain force to open it, and the disc may be accidentally slipped out therefrom while opening the case. It may cause serious damage of the disc and lose the precious information storing in the disc.

The solid plastic disc case normally has a gripping spindle provided at the center portion of the bottom holder for detachably coupling with the disc via the center hole in the center of the disc, so as to substantially hold the disc in position to prevent the unwanted movement and spacedly apart the information side of the disc from the directly contact with the interior surface of the bottom holder. However, it is difficult to remove the disc from the bottom holder via the gripping spindle after the case is being opened. It happens frequently that the compact disc tends to slip out of the user's hand after the user removed the disc out of the gripping spindle. The damage of the disc somehow is unavoidable.

Most of the data disc case provided firmly protection for containing the disc and keep a distance between the information side of the disc and the interior surface of the case is normally made by plastic material. Thus, another issue of environmental protection is another main concern nowadays, since the consumer starts aware of the protection of environment. They may want to buy the product that is eco friendly.

Though there are some paper made disc holder, they tends to be too soft for protecting the disc itself. Most of the paper disc holders have an envelope shape for inserting the disc into the paper disc holder for carrying. Therefore, the directly contact of the disc and the interior surface of the paper disc holder is unavoidable. Scratches always happen on the information side of the disc while inserting into or sliding out of the enveloped paper disc holder.

Those scratches, take a compact media disc storing music information therein for example, the damaged or uneven surface of the information side will reduce the music quality, since the undesired reflected light of the laser beam of the machine for playing the media disc.

SUMMARY OF THE PRESENT INVENTION

A main object of the present invention is to provide a data disc case for accommodating a data disc, wherein the data disc case is one-hand operable for opening the case to reach the disc contained within the case.

Another object of the present invention is to provide a data disc case for accommodating a data disc, wherein when the data disc is being removed from a compartment of the data disc case, an information side of the data disc is not contacting with an interior surface of the compartment, so as to prevent any scratches.

Another object of the present invention is to provide a data disc case, which is capable of automatically releasing the data disc from a spindle of the data disc case when the data disc case is being opened.

Another object of the present invention is to provide a data disc case, wherein the case is capable of being made by paper to form a solid paper case for containing the data disc, so as to be easily recycled for reducing the damage of environment.

Another object of the present invention is to provide a data disc case, wherein the data disc is received in a holder of the data disc case to be retained in position and spaced apart from contacting with an interior surface of the data disc case.

Another object of the present invention is to provide a data disc case, which is capable of being operatively opened and enclosed in a manner of magnetic.

Another object of the present invention is to provide a data disc case, which has a transparent window for displaying a label of the data disc that labels the related information storing in the data disc, so as for recognizing each data discs.

Accordingly, in order to accomplish the above objects, the present invention provides a data disc case, which comprises a base panel having a size equal or larger than a data disc size; and an one-hand operable arrangement which comprises an affixing panel affixing on the base panel and a foldable panel extended from the affixing panel to foldably overlap on the base panel, wherein the affixing panel and foldable panel are extended edge to edge to form a cover panel on the base panel and to define a compartment between the cover panel and the base panel for accommodating a data disc therewithin.

The foldable panel at the cover panel is movably overlapping with the base panel to foldably flip the foldable panel of the cover panel between an open position in a one-hand operable manner for exposing the data disc within the compartment to be accessed and an enclosed position for enclosing the data disc within the data disc case.

These and other objectives, features, and advantages of the present invention will become apparent from the following detailed description, the accompanying drawings, and the appended claims.

DETAILED DESCRIPTION OF THE PREFERRED EMBODIMENT

Figure 1:
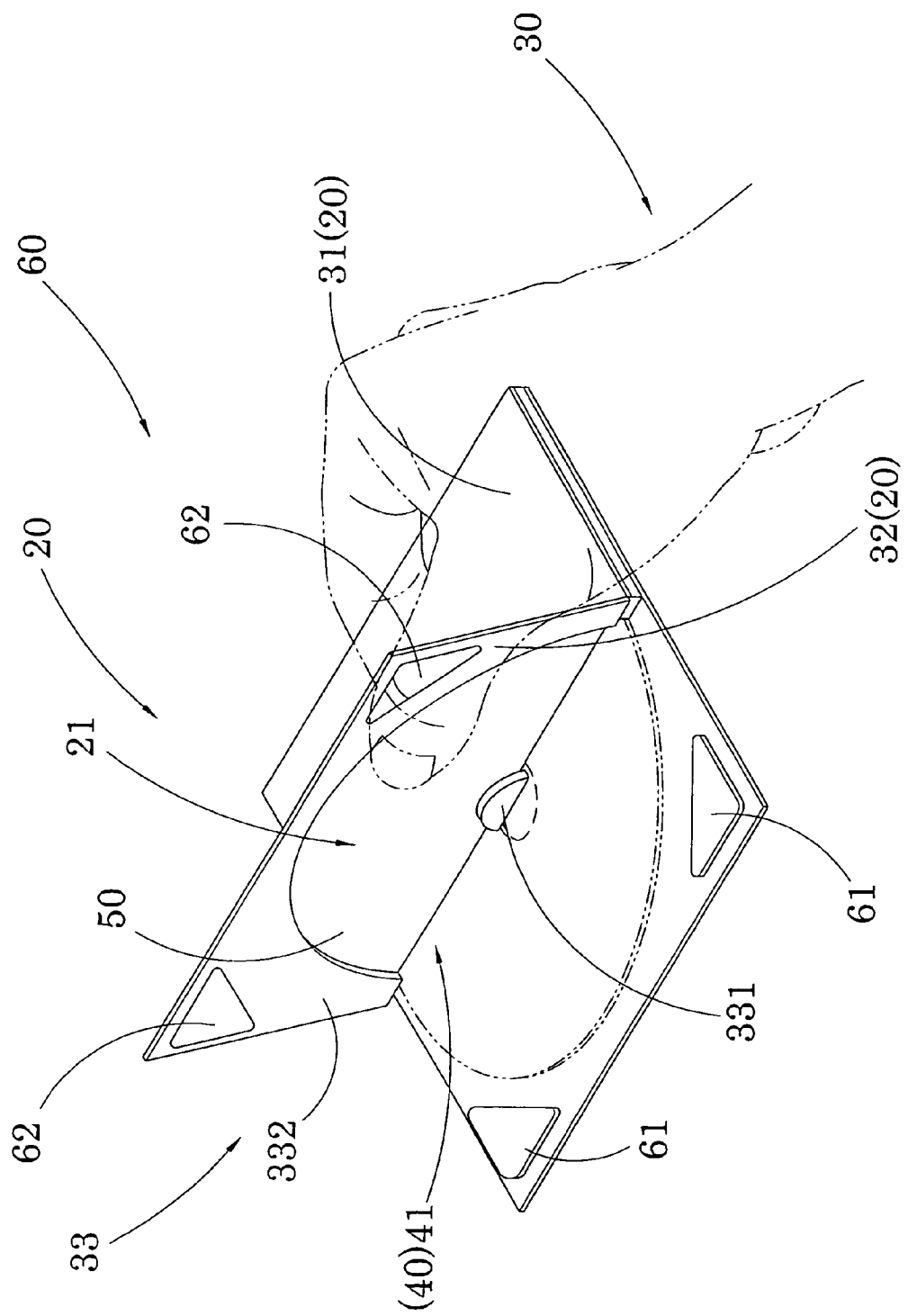
FIG. 1 is a perspective view of a data disc case according to a preferred embodiment of the present invention, illustrating the data disc being opened to access the disc in a one-hand operable manner.
Figure 2:
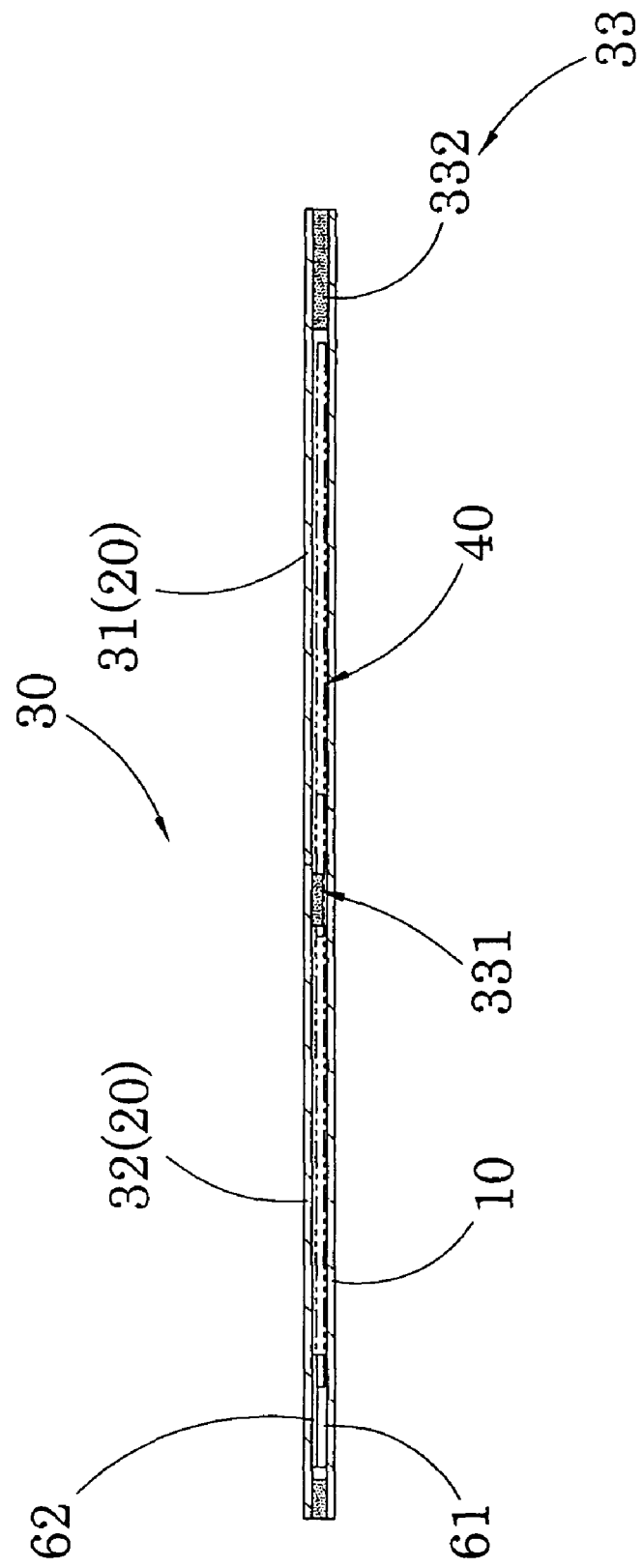
FIG. 2 is a side sectional view of the data disc case according to the preferred embodiment of the present invention, illustrating the cover panel at the opened position.
Figure 3:
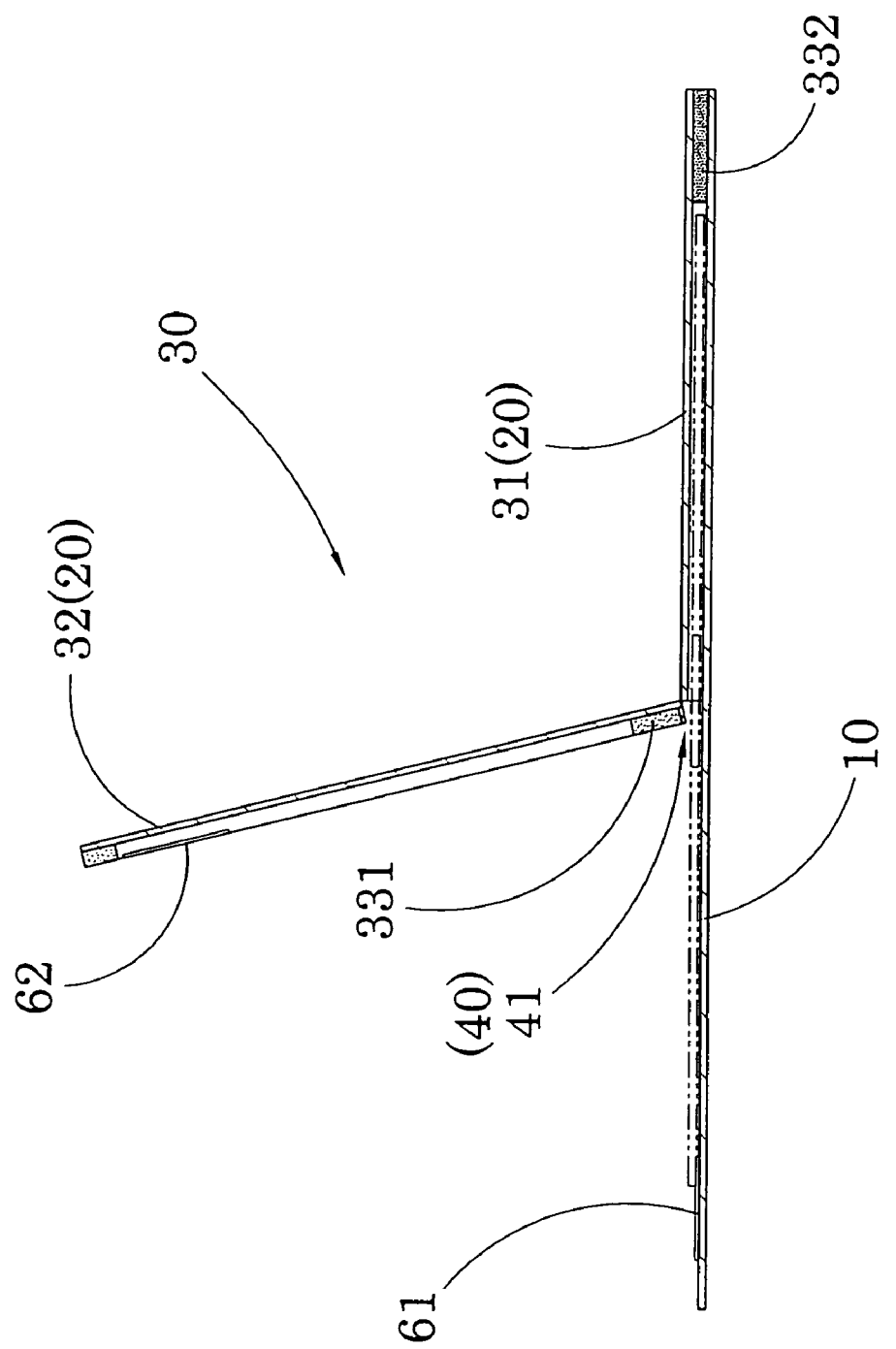
FIG. 3 is another side sectional view of the data disc case according to the preferred embodiment of the present invention, illustrating the cover panel at the enclosed position.

Referring to FIGS. 1 to 3, a data disc case according to a preferred embodiment of the present invention is illustrated, wherein the data disc case comprises a base panel 10, and a one-hand operable arrangement 30.

The one-hand operable arrangement 30 comprises a cover panel 20 overlapping with the base panel 10 to define a compartment 40 therebetween for accommodating a data disc therewithin, wherein the one-hand operable arrangement 30 is adapted for uncovering the cover panel 20 to flip between an opened position to uncover the cover panel 20 and to access the disc in the compartment 40, and an enclosed position in a one-hand operable manner.

The base panel 10 has a size at least equal or larger than the size of the data disc. The disc conventionally has a label side for displaying information related to the data that stored in the data disc, and an information side for being read out of various intensities of reflected light, such as laser beam, so as to edit or read the files or data stored in the data disc. The data disc normally has a circular shape having a center hole at the center portion of the data disc. Accordingly, the interior surface of the base panel 10 is a flat surface for enabling the data disc being slid in and out the compartment 40 when the cover panel 20 is folded at the opened position.

The one-hand operable arrangement 30 comprises an affixing panel 31 formed a portion of the cover panel 20 affixedly overlapping with the base panel 10 to define the compartment 40 therebetween, and a foldable panel 32 formed at another portion the cover panel 20 adapted for being flipped to uncover the cover panel 20 to access the data disc. Accordingly, the foldable panel 32 of the cover panel 20 is preferably integrated with the affixing panel 31 edge-to-edge to form the cover panel 20 in a single planar structure. When the foldable panel 32 of the cover panel 20 is folded at the opened position of the data disc case, the data disc is exposed for being accessed in a one-hand flipping manner, so as to remove the data disc from the compartment 40.

In other words, the foldable panel 32 of the cover panel 20 is adapted for detachably or movably overlapping with the base panel 10 to foldably flip the foldable panel 32 of the cover panel 20 between an open position for exposing the data disc within the compartment 40 to be accessed and an enclosed position for enclosing the data disc within the data disc case in a one-hand operable manner.

Accordingly, when the foldable panel 32 is folded at the opened position, the compartment 40 is partially closed between the affixing panel 31 and the base panel 10, and is partially opened between the foldable panel 32 and the base panel 10. Therefore, the data disc will be partially retained within the compartment 40 and partially exposed out of the compartment 40. So, the data disc is enabled being easily slid into the compartment 40 between the base panel 10 and the affixing panel 31 or being removed from the compartment 40.

In order to remain the data disc within the compartment 40 in position, a holding member 33 for securely accommodating the data disc is further provided at an interior surface 21 of the cover panel 20, wherein the holding member 33 preferably comprises a spindle 331 protruding from a center portion of the interior surface 21 of the cover panel 20 toward the base panel 10. The spindle 331 has a entirely or partially cylindrical shape having a size and shape entirely or partially matching the center hole of the data disc, i.e. the pinch hole thereof, for concentrically and detachably coupling with the data disc via the center hole, so that the data disc within the compartment 40 is being held in position through the spindle 331 when the data disc is enclosed within the data disc case.

The spindle 331 is provided at the interior surface of the foldable panel 32 to partially and concentrically coupling with the center hole of the data disc, so that when the foldable panel 32 is folded at the enclosed position, the spindle 331 is partially and concentrically coupling with the center hole of the data disc to hold the data disc in position. When the foldable panel 32 is folded at the opened position, the spindle 331 is released from the center hole of the data disc, so that the data disc is able to be easily removed from the compartment 40 without contacting the information side of the data disc with the interior surface 21 of the cover panel 20.

Accordingly, the spindle 331 has a half cylindrical shape partially matching with the center hole of the data disc. In other words, when the foldable panel 32 is folded at the closed position, the spindle 331 is moved correspondingly within the compartment 40 for engaging with the center hole of the data disc so as to securely retain the data disc in the compartment 40 in position. When the foldable panel 32 is folded at the opened position, the spindle 331 is moved correspondingly out of the compartment 40 for being released from the center hole of the data disc so as to enable the data disc being removed from the compartment 40.

The holding member 33 of data disc case further comprises a spacing layer 332 provided at a peripheral portion of the interior surface 21 of the cover panel 20 to define a recess 50 indently between the spindle 331 and the spacing layer 332, wherein the spacing layer 332 is sandwiched between the base panel 10 and the cover panel 20 to create a space therebetween so as to form the compartment 40. Accordingly, the spacing layer 332 is preferably provided at the peripheral portion to define the indented recess 50 having a circular shape, which is preferably and approximately matching the size and shape of the data disc, so that the data disc received within the recess 50 is able to fittedly sit at the recess 50 within the compartment 40 when the foldable panel 32 of the cover panel 20 is covering the data disc case, so as to prevent the unwanted movement.

In other words, the spacing layer 332 is provided at the peripheral portion of the cover panel 20 at the interior surface thereof to define the recess 50 for receiving the data disc. Accordingly, when the foldable panel 32 is folded at the opened position, the spacing layer 332 is moved correspondingly for enabling the data disc being moved out of the compartment 40. When the foldable panel 32 is folded at the closed position, the spacing layer 332 is moved correspondingly between the base panel 10 and the cover panel 20 for ensuring the data disc being received in the recess 50 as to retain the data disc in position.

The spacing layer 332 further has two portions, one portion of the spacing layer 332 is provided at the interior surface of the affixing panel 31 of the cover panel 20, and the other portion is provided at the interior surface of foldable panel 32 of the cover panel 20, so that the two portions of the spacing layer 332 are combined to form the recess 50 between the spacing layer 332 and the spindle 331, when the foldable panel 32 of the cover panel 20 is covering the data disc case.

In particular, the first portion of the spacing layer 332 provided at the affixing panel 21 defines a first recess portion between the affixing panel 21 and the base panel 10. The second portion of the spacing layer 332 provided at the foldable panel 32 defines a second recess portion between the foldable panel 22 and the base panel 10. The first and second recess portions are combined to form the recess 50. When the foldable panel 32 is folded at the opened position, the first recess portion within the first portion of the spacing layer 332 is exposed for receiving partial of the data disc thereat, and when the foldable panel 32 is folded at the closed position, the second recess portion within the second portion of the spacing layer 332 is enclosed for enclosing the data disc within the first and second recess portions of the spacing layer 332. Preferably, each of the first and second recess portions of the spacing layer 332 has a semi-circular shape.

It is worth to mention that the spindle 331 is partially provided at the foldable panel 32 of the cover panel 20, so that when the foldable panel 32 of the cover panel 20 is folded to uncover the data disc case, the spindle 331 is automatically released to detach from the center hole of the data disc, so as to be easily remove the data disc from the compartment 40 of the data disc case.

Accordingly, the foldable panel 32 preferably has a shape identical to the affixing panel 31, wherein the foldable panel 32 is extended from the affixing panel 31 to form the cover panel 20, which is embodied as a rectangular shape for overlapping with the base panel 10, so as to accommodate the data disc within the compartment 40 between the base panel 10 and cover panel 20. It is appreciated that rectangular shaped base panel 10 and cover panel 20 is capable of minimizing the overall size of the data disc case. The two identical configurations of the affixing panel 31 and foldable panel 32 is adapted for simplifying the manufacturing process and minimizing the cost, so as to be comfortably operated in one-hand manner.

In other words, the size of the foldable panel 32 is the same as the size of the affixing panel 32. Therefore, when the foldable panel 32 is folded at the opened position, a half portion of the compartment 40 is opened for exposing a half portion of the data disc. It is worth mentioning that another half portion of the data disc is still covered between the affixing panel 31 and the base panel 10.

The spacing layer 332 at the interior surface of the affixing panel 31 is further affixedly overlapping with an interior surface of the base panel 10 to overlap the base panel 10 with the cover panel 20 and to form the compartment 40 having a half recess 50 for inserting the data disc therewithin. In other words, partial of the data disc, embodied as half of data disc, is accommodated within the recess 50 while the foldable panel 32 of the cover panel 20 is being folded to uncover the data disc case, so as to be slidably removing the data disc out of the compartment 40.

The data disc is sliding into the recess 50 at the affixing panel 32 within the compartment 40 until the data disc is fixedly accommodated and stopped by the spacing layer 332 between the interior surface of affixing panel 32 and the base panel 10, so as to align with the spindle 331 of the holding member 33 when the foldable panel 32 is folded to cover the data disc within the data disc case. Thus, the information side of the data disc is facing upwardly for slidably being received in the compartment 40.

In other words, the data disc is fittedly seated within the recess 50 formed between the spindle 331 and the protruding portion 332 to prevent the unwanted movement and securely accommodating the data disc therewithin. The information side of the data disc, which has a plurality indentations codes thereon for optically being read out the information stored in the data disc, is facing upwardly toward the interior surface of the cover panel 10 while the label side of the data disc is sliding at the base panel 10 for being received in the compartment 40.

It is worth to mention that the spindle 331 and the spacing layer 332 protruding from the cover panel 10 toward the base panel 20 provides a predetermined distance, which is slightly larger than a thickness of the data disc, between the base panel 10 and the cover panel 20 to form the recess 50 therebetween, so that when the foldable panel 32 is folded to expose the data disc accommodated by the compartment 40 at the opened position, the data disc is being slidably removed out of the compartment 40 without contacting the information side of the data disc with the interior surface 21 of the cover panel 20, so as to prevent any scratches on the information side to reduce the quality of reading out the information stored thereat.

The spacing layer 332 at the peripheral edge of interior surface of the affixing panel 31 forms an opening 41 of the compartment 40 for slidably receiving the data disc when the foldable panel 32 of the cover panel 20 is folded at the opened position. It is appreciated that the opening 41 has a width equal or slightly larger than the diameter of the data disc, so that the data disc is able to be slidably received within the compartment 40 through the opening 41.

Therefore, the foldable panel 32 of the one-hand operable arrangement 30 at the cover panel 20 is able to be upwardly flipped to open by one hand, which is similar to open book cover operation, and release the pinch of the data disc detachably coupling with the spindle 331 of the holding member 33 at the interior surface 21 of the cover panel 20 while folding the foldable panel 32 at the opened position. It is not only easy to uncover the data disc case by one-hand operation, but also to simply remove the data disc from the compartment 40 of the data disc case. Thus, when a user is driving or only having one hand free to operate the data disc case, the one-hand operable data case enables the user to open the case simply by one-hand operable manner and remove the data disc therefrom.

Accordingly, the base panel 10 and the cover panel 20 are preferably made by solid material, such as plastic, recycled plastic material, biodegradable plastic material, cardboard paper material, corrugated paper, or the likes, so as to provide a firmly protection for the data disc accommodated within the compartment 40 of the data disc case. The spindle 331 and the spacing layer 332 are preferably made by paper material, which has a predetermined thickness for retaining the data disc in position and spacing apart between the base panel 31 and cover panel 32.

It is appreciated that the entire data disc case is able to be made by paper material and provide a securely protection while the data disc is accommodated therewithin and slidably removing from the data disc case, so as to be easily recycled after retiring the data disc case. Thus, the present invention is able to provide a relatively more secure and environmental friendly data disc case.

In order to securely enclose the data disc within the compartment 40 of the data disc case, the data disc case further comprises a locking arrangement 60 provided for securely enclosing the data disc at the recess 50 at the enclosed position. The locking arrangement 60 comprises one or more first fastener 61 provided at the base panel 10, and one or more second fastener 62 provided at the cover panel 20 for aligning with the first fastener 61 while the foldable panel 32 of the cover panel 20 is folded at the enclosed position, so as to enclose the data disc in the compartment 40 the data disc case.

The second fasteners 62 are embodied as magnets and the first fasteners 61 are embodiment as a metal material for detachably coupling with the second fastener 62 in a magnetically attracting manner, wherein the second fasteners 62 are provided at a peripheral interior surface of the foldable panel 32, and more particularly at the surface of the spacing layer 332 at the interior surface of the foldable panel 32. The first fasteners 61 are preferably provided at a peripheral portion of the interior surface of the base panel 20 to align with the second fasteners 62 at the foldable panel 32 of the cover panel 20, such that the foldable panel 32 of the cover panel 20 is able to detachably overlapping with the base panel 10 at the enclosed position.

In order to evenly coupling the foldable panel 32 of the cover panel 20 with the base panel 10, the second fastener 62 is preferably indentedly embedded at the spacing layer 332 to form a flat surface between the second fastener 62 and the spacing layer 332. The fasteners 61 are preferably a thin piece of metal for magnetically coupling with the second fasteners 62. The first and second fasteners 61, 62 are interchangeable.

It is worth mentioning that since the first and second fasteners 61, 62 are provided at the interior surfaces of the base panel 10 and the foldable panel 32, the locking arrangement 60 will be hidden when the foldable panel 32 is folded at the closed position. In other words, when the second fastener 62 is detachably coupled with the first fastener 61, the foldable panel 32 is folded at the closed position to keep the locking arrangement 60 in a hidden manner.

The locking arrangement 60 also can be an interlocking fastener, hook and loop fasteners, or any other detachably coupling manner for securely enclosing the data disc accommodated within the compartment 40 of the data disc case.

Figure 4:
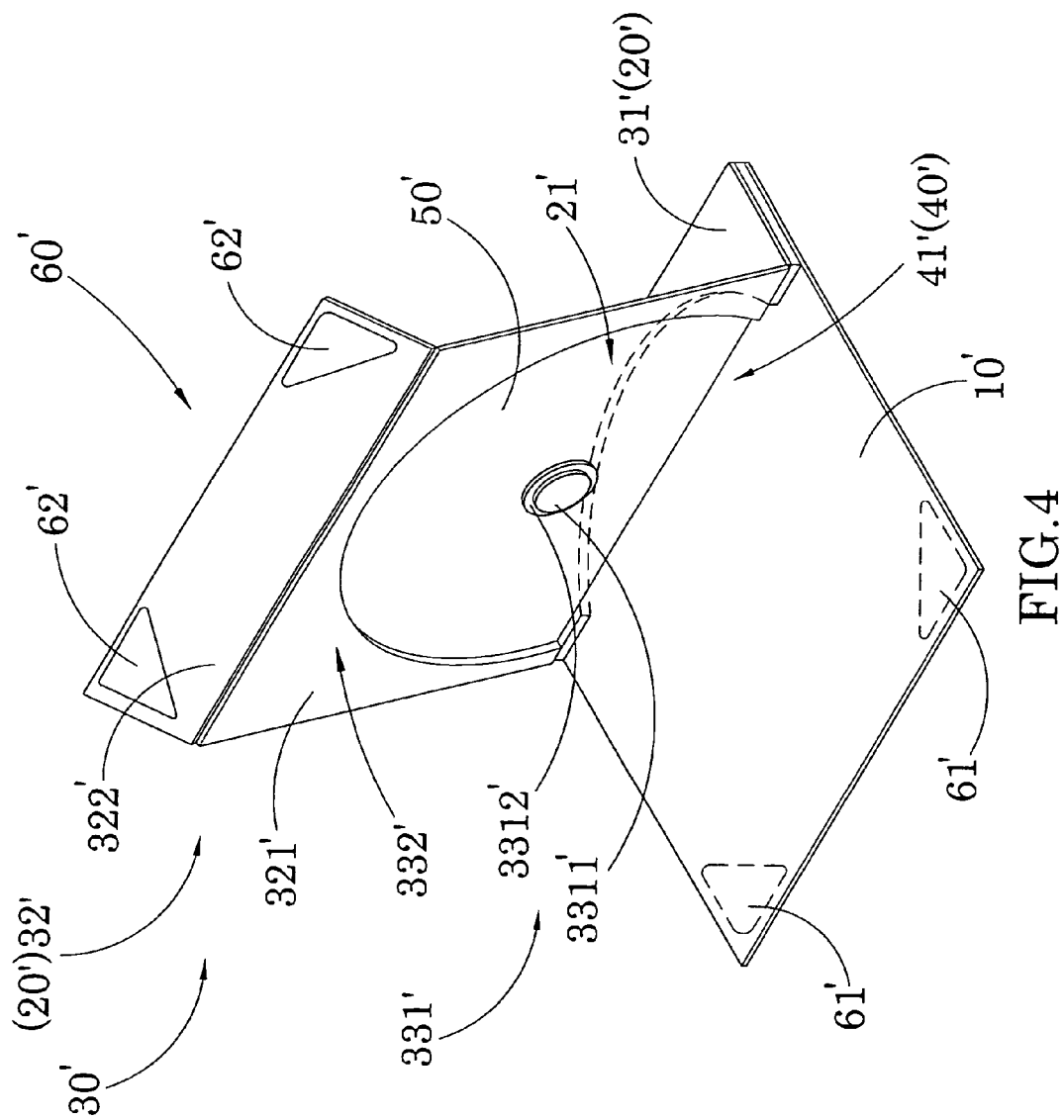
FIG. 4 is a perspective view of a disc case according to a second preferred embodiment of the present invention.

Referring to FIG. 4 of the drawings, a data disc case according to a second preferred embodiment of the present invention is illustrated, wherein the data disc case comprises a base panel 10', and a one-hand operable arrangement 30', wherein the and a one-hand operable arrangement 30' comprises a cover panel 20' overlapping with the base panel 10' to define a compartment 40' therebetween for accommodating a data disc therewithin. The one-hand operable arrangement 30' is adapted for uncovering the cover panel 20' to flip between an opened position to uncover the cover panel 20' for accessing the disc in the compartment 40', and an enclosed position in a one-hand operable manner. The base panel 10' and cover panel 20' have a size at least equal or larger than the size of the data disc. Accordingly, the interior surface of the base panel 10' is a flat surface for enabling the data disc being slid in and out the compartment 40' when the cover panel 20' is folded at the opened position.

The one-hand operable arrangement 30' comprises an affixing panel 31' of the cover panel 20' affixedly overlapping with the base panel 10' edge by edge to define the compartment 40' therebetween, and a foldable panel 32' of the cover panel 20' adapted for being flipped to uncover the cover panel 20' to access the data disc. When the foldable panel 32' of the cover panel 20' is folded at the opened position of the data disc case, the data disc is exposed for being accessed in a one-hand flipping manner, so as to remove the data disc from the compartment 40'.

In other words, the foldable panel 32' of the cover panel 20' is adapted for detachably or movably overlapping with the base panel 10' to foldably flip the foldable panel 32' of the cover panel 20' between an opened position for exposing the data disc within the compartment 40' to be accessed and an enclosed position for enclosing the data disc within the data disc case in a one-hand operable manner.

In order to remain the data disc within the compartment 40' in position, a holding member 33' is further provided at an interior surface 21' of the cover panel 20', wherein the holding member 33' comprises a spindle 331' fixedly protruding from a center portion of the interior surface 21' of the cover panel 20' toward the base panel 10'. Accordingly, the spindle 331' has a cylindrical shape matching with the center hole of the data disc.

In particular, the spindle 331' has a coupling portion 3311' having a cylindrical shape, which has a size and shape geographically matching the center hole of the data disc for concentrically and detachably coupling with the data disc via the center hole, so that the data disc within the compartment 40' is being held in position through the coupling portion 3311' of spindle 331' when the data disc is enclosed within the data disc case.

The spindle 331' further has a supporting portion 3312' integrally surrounding the coupling portion 3311', wherein the supporting portion 3312' has a thickness less than the coupling portion 3311' to form a ladder-shaped spindle 331', so that the data disc is able to detachably coupling with the coupling portion 3311' and being supported on a surface of the supporting portion 3312', so as to avoid the directly contact the information side of the data disc with the interior surface of the cover panel 20. Preferably, the diameter of the coupling portion 3311' of the spindle 331' is slightly smaller than the diameter of the center hole of the data disc such that when the foldable panel 32' is folded to enclose the compartment 40', the spindle 331' is fittingly disposed within the center hole of the data disc. Accordingly, the supporting portion 3312' of the spindle 331' is made of anti-skidding material, such as rubber, to contact with the data disc around the center hole such that when the foldable panel 32' is folded to enclose the compartment 40', the coupling portion 3311' of the spindle 331' is slidably inserted into the center hole of the data disc to retain the data disc in position while the supporting portion 3312' of the spindle 331' is frictionally contacted with the data disc around the center hole thereof for preventing an unwanted movement of the data disc within the compartment 40'.

The spindle 331' is provided at the interior surface of the foldable panel 32 to concentrically coupling with the center hole of the data disc, so that when the foldable panel 32' is folded at the enclosed position, the spindle 331' is concentrically coupling with the center hole of the data disc to hold the data disc in position. When the foldable panel 32' is folded at the opened position, the spindle 331' is released from the center hole of the data disc, so that the data disc is able to be easily removed from the compartment 40' without contacting the information side of the data disc with the interior surface 21' of the cover panel 20'.

The data disc case further comprises a spacing layer 332' provided at a peripheral portion of the interior surface 21' of the cover panel 20' to define a recess 50' indentedly between the spindle 331' and the spacing layer 332' for holding the data disc therewithin, wherein the spacing layer 332' is preferably provided at the peripheral portion to define the indented recess 50' having a circular shape, which is preferably and approximately matching the size and shape of the data disc, so that the data disc received within the recess 50' is able to fittedly sit at the recess 50' within the compartment 40' when the foldable panel 32' of the cover panel 20' is covering the data disc case, so as to prevent the unwanted movement.

The spacing layer 332' further has two portions, one portion of the spacing layer 332' is provided at the interior surface of the affixing panel 31' of the cover panel 20', and the other portion is provided at the interior surface of foldable panel 32' of the cover panel 20', so that the two portions of the spacing layer 332' are combined to form the recess 50' between the spacing layer 332' and the spindle 331', when the foldable panel 32' of the cover panel 20' is covering the data disc case. The circular shaped recess 50' having a size and shape matching the data disc is concentrically aligning with the spindle 331', so as to fittedly accommodate the data disc between the coupling portion 3311' of the spindle 331' and the spacing layer 332'.

In particular, the first portion of the spacing layer 332' provided at the affixing panel 21' defines a first recess portion between the affixing panel 21' and the base panel 10'. The second portion of the spacing layer 332' provided at the foldable panel 32' defines a second recess portion between the foldable panel 22' and the base panel 10'. The first and second recess portions are combined to form the recess 50'. When the foldable panel 32' is folded at the opened position, the first recess portion within the first portion of the spacing layer 332' is exposed for receiving partial of the data disc thereat, and when the foldable panel 32' is folded at the closed position, the second recess portion within the second portion of the spacing layer 332' is enclosed for enclosing the data disc within the first and second recess portions of the spacing layer 332'. Preferably, each of the first and second recess portions of the spacing layer 332' has an arc-shape.

It is worth to mention that the spindle 331' is provided at the foldable panel 32' of the cover panel 20', so that when the foldable panel 32' of the cover panel 20' is folded to uncover the data disc case, the spindle 331' is automatically released to detach from the center hole of the data disc, so as to easily remove the data disc from the compartment 40' of the data disc case.

Accordingly, the foldable panel 32' preferably has a rectangular shape larger than the affixing panel 31' of the cover panel 20', wherein the foldable panel 32' is integrally extended from the affixing panel 31' to form the cover panel 20', so that the cylindrical spindle 331' concentric to the recess 50' is located at the interior surface of the cover panel 20'.

The foldable panel 32' has a size larger than a size of the affixing panel 31' such that the foldable panel is folded at the opened position for exposing more than a half portion of the data disc.

The foldable panel 32' has a first folding panel 321' and a second folding panel 322' extended from the first folding panel 321' edge-to-edge to form a triple folded cover panel 20. the first folding panel 321' is extended from the affixing panel 31' to form the cover panel 20', which is embodied as a square shape for overlapping with the base panel 10', so as to accommodate the data disc within the compartment 40' between the base panel 10' and cover panel 20'. It is appreciated that rectangular shaped base panel 10' and cover panel 20' is capable of minimizing the overall size of the data disc case.

The second folding panel 322' extended from the first folding panel 321' is folded to partially overlapping with an exterior surface of the base panel 10' while the first folding panel 321' is overlapping with the interior surface of the base panel 20', so that the second folding panel 322' is adapted to relatively more securely enclose the data disc within the data disc case at the enclosed position.

The spacing layer 332' at the interior surface of the affixing panel 31' is further affixedly overlapping with an interior surface of the base panel 10' to overlap the base panel 10' with the cover panel 20' and to form the compartment 40' having partial of the recess 50' for inserting the data disc therewithin. In other words, partial of the data disc is accommodated within the recess 50' while the foldable panel 32' of the cover panel 20' is being folded to uncover the data disc case, so as to be slidably removing the data disc out of the compartment 40'.

The data disc is sliding into the recess 50' at the affixing panel 32' within the compartment 40' until the data disc is fixedly accommodated and stopped by the spacing layer 332' between the interior surface of affixing panel 32' and the base panel 10', so as to align with the spindle 331' of the holding member 33' when the foldable panel 32' is folded to cover the data disc within the data disc case. Thus, the information side of the data disc is facing upwardly for slidably being received in the compartment 40'.

In other words, the data disc is fittedly seated within the recess 50' formed between the spindle 331' and the spacing layer 332' to prevent the unwanted movement and securely accommodating the data disc therewithin. The information side of the data disc, which has a plurality indentations codes thereon for optically being read out the information stored in the data disc, is facing upwardly toward the interior surface of the cover panel 10' while the label side of the data disc is sliding at the base panel 10' for being received in the compartment 40'.

It is worth to mention that the spindle 331' and the spacing layer 332' protruding from the cover panel 10' toward the base panel 20' provides a predetermined distance, which is slightly larger than a thickness of the data disc, between the base panel 10' and the cover panel 20' to form the recess 50' therebetween, so that when the foldable panel 32' is folded to expose the data disc accommodated by the compartment 40' at the opened position, the data disc is being slidably removed out of the compartment 40' without contacting the information side of the data disc with the interior surface 21' of the cover panel 20', so as to prevent any scratches on the information side to reduce the quality of reading out the information stored thereat.

The spacing layer 332' at the peripheral edge of interior surface of the affixing panel 31' forms an opening 41' of the compartment 40' for slidably receiving the data disc when the foldable panel 32' of the cover panel 20' is folded at the opened position. It is appreciated that the opening 41' has a width equal or slightly larger than the diameter of the data disc, so that the data disc is able to be slidably received within the compartment 40' through the opening 41'.

Therefore, the foldable panel 32' of the one-hand operable arrangement 30' at the cover panel 20' is able to be upwardly flipped to open by one hand, which is similar to open book cover operation, and release the pinch of the data disc detachably coupling with the spindle 331' of the holding member 33' at the interior surface 21' of the cover panel 20' while folding the foldable panel 32' at the opened position. It is not only easy to uncover the data disc case by one-hand operation, but also to simply remove the data disc from the compartment 40' of the data disc case. Thus, when a user is driving or only having one hand free to operate the data disc case, the one-hand operable data case enables the user to open the case simply by one-hand operable manner and remove the data disc therefrom.

Accordingly, the base panel 10' and the cover panel 20' are preferably made by solid material, such as plastic, recycled plastic material, biodegradable plastic material, cardboard paper material, corrugated paper, or the likes, so as to provide a firmly protection for the data disc accommodated within the compartment 40' of the data disc case. The spindle 331' and the spacing layer 332' are preferably made by paper material or sponge, which has a predetermined thickness for retaining the data disc in position and spacing apart between the base panel 31' and cover panel 32'. The supporting portion 3312' of the spindle 331' has a predetermined thickness for substantially separating the information side of the data disc and the interior surface 21' of the cover panel 20'.

It is appreciated that the entire data disc case is able to be made by paper material and provide a securely protection while the data disc is accommodated therewithin and slidably removing from the data disc case, so as to be easily recycled after retiring the data disc case. Thus, the present invention is able to provide a relatively more secure and environmental friendly data disc case.

In order to securely enclose the data disc within the compartment 40' of the data disc case, the data disc case further comprises a locking arrangement 60' provided for securely enclosing the data disc at the recess 50' at the enclosed position. The locking arrangement 60' comprises one or more first fastener 61' provided at the interior surface of the base panel 10, and one or more second fastener 62' provided at an interior surface of the second folding panel 322' of the foldable panel 32' of the cover panel 20' for aligning with the first fastener 61' while the foldable panel 32' of the cover panel 20' is folded at the enclosed position, so as to enclose the data disc in the compartment 40' the data disc case.

It is worth mentioning that since the first and second fasteners 61', 62' are provided at the interior surfaces of the base panel 10' and the foldable panel 32', the locking arrangement 60' will be hidden when the foldable panel 32 is folded at the closed position.

Therefore, the first fasteners 61' and second fasteners 62' are embodied to detachably coupling with each other for securely locking and enclosing the data disc within the data disc case in a magnetic manner.

The locking arrangement 60' also can be an interlocking fastener, a set of hook and loop of buckle, or any other detachably coupling manner for securely enclosing the data disc accommodated within the compartment 40' of the data disc case.

Figure 5:
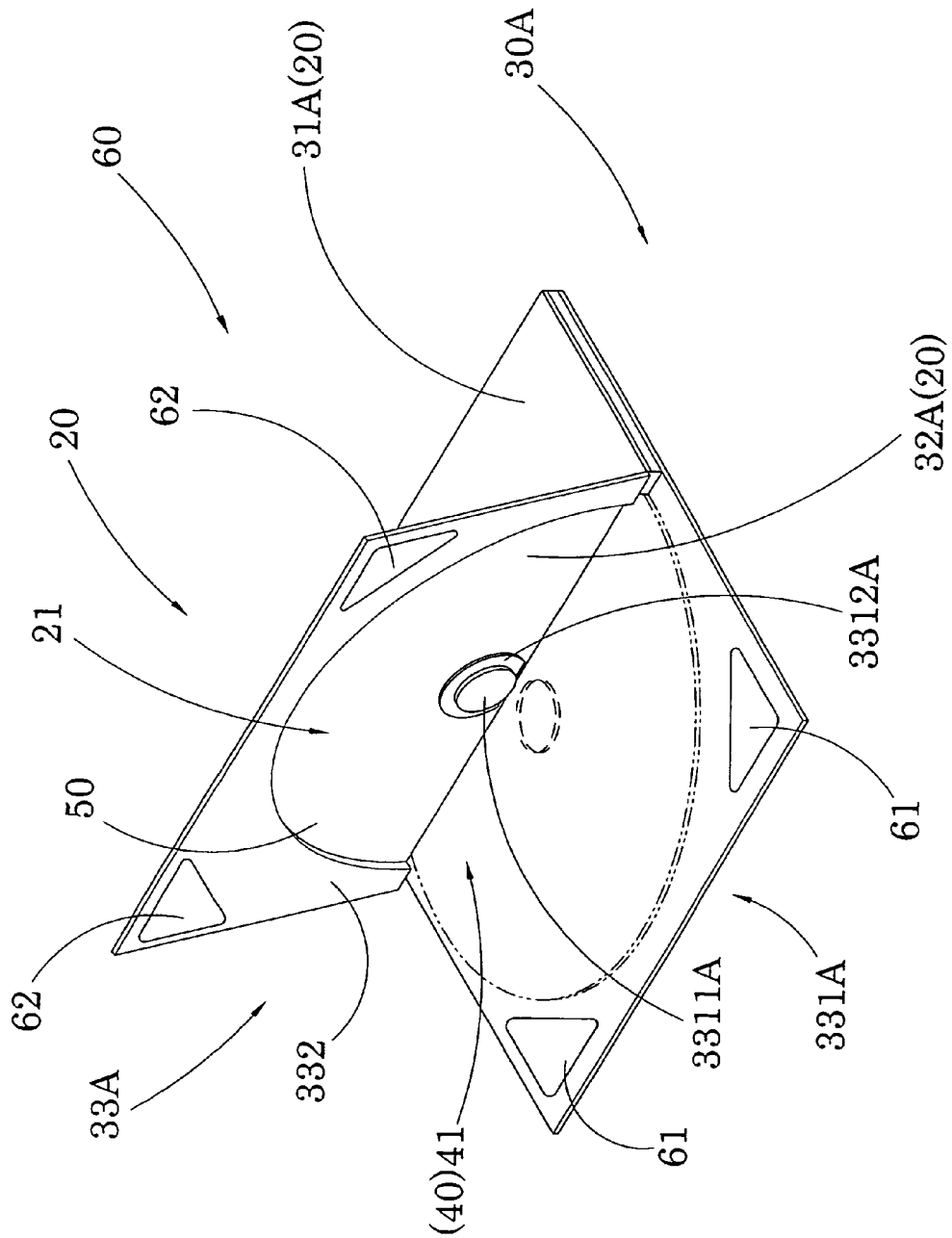
FIG. 5 is a perspective view of an alternative disc case according to the first and second preferred embodiments of the present invention.

Referring to FIG. 5, an alternative data disc case according to the first and second preferred embodiments of the present invention is illustrated, wherein the data disc case has the same structure as the first preferred embodiment besides the one-hand operable arrangement 30A, which comprises an affixing panel 31A and a foldable panel 32A extended from the affixing panel 31A edge-to-edge to form the cover panel 20 in a single planner structure.

The foldable panel 32A is non-identical to the affixing panel 31A, preferably having a larger area than the affixing panel 31A, wherein when the foldable panel 32A is unfolded to expose the compartment 40, the center hole of the data disc will be entirely exposed. In other words, the inner edge of the foldable panel 32A is tangent to the center hole of the data disc. Therefore, the spindle 331A of the holding member 33A has an entirely cylindrical shape matching the size and shape of the center hole of the data disc provided on the interior surface of the foldable panel 32A at the center portion of the interior surface 21 of the cover panel 20. It is worth mentioning that when the foldable panel 32A is unfolded, a relatively larger area of the data disc is exposed for the user to take the data disc out of the compartment 40.

The spindle 331A has the same structure as the spindle 331' described in the second embodiment, which comprises a coupling portion 3311A having the cylindrical shape, and a supporting portion 3312A, so that the data disc is able to detachably coupling with the coupling portion 3311A and being supported on a surface of the supporting portion 3312A, so as to avoid the directly contact the information side of the data disc with the interior surface of the cover panel 20. Preferably, the diameter of the coupling portion 3311A of the spindle 331A is slightly smaller than the diameter of the center hole of the data disc such that when the foldable panel 32A is folded to enclose the compartment 40, the spindle 331A is fittingly disposed within the center hole of the data disc. Accordingly, the supporting portion 3312A of the spindle 331A is made of anti-skidding material, such as rubber, to contact with the data disc around the center hole such that when the foldable panel 32A is folded to enclose the compartment 40, the coupling portion 3311A of the spindle 331A is slidably inserted into the center hole of the data disc to retain the data disc in position while the supporting portion 3312A of the spindle 331A is frictionally contacted with the data disc around the center hole thereof for preventing an unwanted movement of the data disc within the compartment 40.

It is worth mentioning that the first fastener 61 can be embedded on the inner surface of the base panel 10, as shown in FIG. 5, such that the inner surface of the base panel 10 forms a flat surface for preventing the data disc from being scratched accidentally when the data disc is removed from the compartment 40.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A data disc case for a data disc, comprising:

a base panel; and a one-hand operable arrangement, which comprises:

a cover panel overlapping with said base panel to define a compartment between an interior surface of said base panel and an interior surface of said cover panel for accommodating said data disc within said compartment, wherein said cover panel comprises an affixing panel affixed on said base panel and a foldable panel pivotally coupled with said affixing panel edge-to-edge to pivotally fold between an opened position and a closed position, wherein at said opened position, said foldable panel is pivotally and upwardly folded to expose said compartment for enabling said data disc being slid into said compartment between said base panel and said affixing panel and for enabling said data disc being removed from said compartment, and at said closed position, said foldable panel is pivotally and downwardly folded to enclose said compartment; and a spindle protruding from said interior surface of said foldable panel for concentrically and detachably coupling with a center hole of said data disc, wherein when said foldable panel is folded at said closed position, said spindle is moved correspondingly within said compartment for engaging with said center hole of said data disc so as to securely retain said data disc in said compartment in position, wherein when said foldable panel is folded at said opened position, said spindle at said foldable panel is moved correspondingly out of said compartment for being released from said center hole of said data disc so as to enable said data disc being removed from said compartment;

wherein said foldable panel is integrated with said affixing panel edge-to-edge to form a single planar structure of said cover panel, wherein said foldable panel has a size larger than a size of said affixing panel such that said foldable panel is folded at said opened position for exposing more than a half portion of said data disc;

wherein said spindle has a cylindrical shape matching with said center hole of said data disc, wherein said spindle has a supporting portion protruding from said interior surface of said foldable panel and a coupling portion extended from said supporting portion, wherein said supporting portion has a thickness less than a thickness of said coupling portion to form a ladder-shaped configuration of said spindle, wherein a diameter of said coupling portion is slightly smaller than a diameter of said center hole of said data disc, wherein when said foldable panel is folded at said closed position, said coupling portion of said spindle is arranged for disposing at said center hole of said data disc while said supporting portion is arranged for contacting with a surface of said data disc around said center hole thereof so as to prevent said surface of said data disc being direct contacted with said interior surface of said cover panel.

2. A data disc case for a data disc, comprising:

a base panel; and a one-hand operable arrangement, which comprises:

a cover panel overlapping with said base panel to define a compartment between an interior surface of said base panel and an interior surface of said cover panel for accommodating said data disc within said compartment, wherein said cover panel comprises an affixing panel affixed on said base panel and a foldable panel pivotally coupled with said affixing panel edge-to-edge to pivotally fold between an opened position and a closed position, wherein at said opened position, said foldable panel is pivotally and upwardly folded to expose said compartment for enabling said data disc being slid into said compartment between said base panel and said affixing panel and for enabling said data disc being removed from said compartment, and at said closed position, said foldable panel is pivotally and downwardly folded to enclose said compartment;

a spindle protruding from said interior surface of said foldable panel for concentrically and detachably coupling with a center hole of said data disc, wherein when said foldable panel is folded at said closed position, said spindle is moved correspondingly within said compartment for engaging with said center hole of said data disc so as to securely retain said data disc in said compartment in position, wherein when said foldable panel is folded at said opened position, said spindle at said foldable panel is moved correspondingly out of said compartment for being released from said center hole of said data disc so as to enable said data disc being removed from said compartment; and a locking arrangement for releasably locking said foldable panel at said closed position, wherein said locking arrangement comprises at least one first fastener provided at said interior surface of said base panel and at least one second fastener provided at said interior surface of said foldable panel to align with and detachably couple with said first fastener when said foldable panel is folded at said closed position, so as to keep said locking arrangement in a hidden manner when said foldable panel is folded at said closed position;

wherein said one-hand operable arrangement further comprises a spacing layer provided at a peripheral portion of said cover panel at said interior surface thereof to define a recess for receiving said data disc, wherein when said foldable panel is folded at said opened position, said spacing layer is moved correspondingly for enabling said data disc being moved out of said compartment, wherein when said foldable panel is folded at said closed position, said spacing layer is moved correspondingly between said base panel and said cover panel for ensuring said data disc being received in said recess as to retain said data disc in position;

wherein said spacing layer has a first portion provided at said affixing panel to define a first recess portion and a second portion provided at said foldable panel to define a second recess portion that said first and second recess portions are combined to form said recess, wherein when said foldable panel is folded at said opened position, said first recess portion within said first portion of said spacing layer is exposed for receiving partial of said data disc thereat, and when said foldable panel is folded at said closed position, said second recess portion within said second portion of said spacing layer is enclosed for enclosing said data disc within said first and second recess portions of said spacing layer;

wherein said interior surface of said base panel is a flat surface for enabling said data disc being slid in and out said compartment when said foldable panel is folded at said opened position;

wherein said foldable panel is integrated with said affixing panel edge-to-edge to form a single planar structure of said cover panel, wherein said foldable panel has a size larger than a size of said affixing panel such that said foldable panel is folded at said opened position for exposing more than a half portion of said data disc;

wherein said spindle has a cylindrical shape matching with said center hole of said data disc, wherein said spindle has a supporting portion protruding from said interior surface of said foldable panel and a coupling portion extended from said supporting portion, wherein said supporting portion has a thickness less than a thickness of said coupling portion to form a ladder-shaped configuration of said spindle, wherein a diameter of said coupling portion is slightly smaller than a diameter of said center hole of said data disc, wherein when said foldable panel is folded at said closed position, said coupling portion of said spindle is arranged for disposing at said center hole of said data disc while said supporting portion is arranged for contacting with a surface of said data disc around said center hole thereof so as to prevent said surface of said data disc being direct contacted with said interior surface of said cover panel.

3. A data disc case for a data disc, comprising:

a base panel; and a one-hand operable arrangement, which comprises:

a cover panel overlapping with said base panel to define a compartment between an interior surface of said base panel and an interior surface of said cover panel for accommodating said data disc within said compartment, wherein said cover panel comprises an affixing panel affixed on said base panel and a foldable panel pivotally coupled with said affixing panel edge-to-edge to pivotally fold between an opened position and a closed position, wherein at said opened position, said foldable panel is pivotally and upwardly folded to expose said compartment for enabling said data disc being slid into said compartment between said base panel and said affixing panel and for enabling said data disc being removed from said compartment, and at said closed position, said foldable panel is pivotally and downwardly folded to enclose said compartment; and a spindle protruding from said interior surface of said foldable panel for concentrically and detachably coupling with a center hole of said data disc, wherein when said foldable panel is folded at said closed position, said spindle is moved correspondingly within said compartment for engaging with said center hole of said data disc so as to securely retain said data disc in said compartment in position, wherein when said foldable panel is folded at said opened position, said spindle is moved correspondingly out of said compartment for being released from said center hole of said data disc so as to enable said data disc being removed from said compartment, wherein said foldable panel is integrated with said affixing panel edge-to-edge to form a single planar structure of said cover panel, wherein said foldable panel has a size larger than a size of said affixing panel such that said foldable panel is folded at said opened position for exposing more than a half portion of said data disc, wherein said foldable panel comprises a first folding panel extended from said affixing panel edge-to-edge, and a second folding panel extended from said first folding panel edge-to-edge to form a triple folded configuration of said cover panel.

4. The data disc case, as recited in claim 3, further comprising a locking arrangement for releasably locking said foldable panel at said closed position, wherein said locking arrangement comprises at least one first fastener provided at said interior surface of said base panel and at least one second fastener provided at said interior surface of said foldable panel to align with and detachably couple with said first fastener when said foldable panel is folded at said closed position, so as to keep said locking arrangement in a hidden manner when said foldable panel is folded at said closed position, wherein said one-hand operable arrangement further comprises a spacing layer provided at a peripheral portion of said cover panel at said interior surface thereof to define a recess for receiving said data disc, wherein when said foldable panel is folded at said opened position, said spacing layer is moved correspondingly for enabling said data disc being moved out of said compartment, wherein when said foldable panel is folded at said closed position, said spacing layer is moved correspondingly between said base panel and said cover panel for ensuring said data disc being received in said recess as to retain said data disc in position, wherein said spacing layer has a first portion provided at said affixing panel to define a first recess portion and a second portion provided at said foldable panel to define a second recess portion that said first and second recess portions are combined to form said recess, wherein when said foldable panel is folded at said opened position, said first recess portion within said first portion of said spacing layer is exposed for receiving partial of said data disc thereat, and when said foldable panel is folded at said closed position, said second recess portion within said second portion of said spacing layer is enclosed for enclosing said data disc within said first and second recess portions of said spacing layer, wherein said interior surface of said base panel is a flat surface for enabling said data disc being slid in and out said compartment when said foldable panel is folded at said opened position.

5. The data disc case, as recited in claim 4, wherein said spindle has a cylindrical shape matching with said center hole of said data disc, wherein said spindle has a supporting portion protruding from said interior surface of said foldable panel and a coupling portion extended from said supporting portion, wherein said supporting portion has a thickness less than a thickness of said coupling portion to form a ladder-shaped configuration of said spindle, wherein a diameter of said coupling portion is slightly smaller than a diameter of said center hole of said data disc, wherein when said foldable panel is folded at said closed position, said coupling portion of said spindle is arranged for disposing at said center hole of said data disc while said supporting portion is arranged for contacting with a surface of said data disc around said center hole thereof so as to prevent said surface of said data disc being direct contacted with said interior surface of said cover panel.

* * * * *